United States Patent Office 2,833,744
Patented May 6, 1958

2,833,744

POLYUREAS AND PROCESS OF PREPARING SAME

Robert Neher, Binningen, Switzerland, assignor to Ciba Pharmaceutical Products, Inc., Summit, N. J.

No Drawing. Application August 24, 1954
Serial No. 451,955

Claims priority, application Switzerland August 27, 1953

11 Claims. (Cl. 260—77.5)

This invention relates to polyureas and a process for manufacturing them. More particularly the invention provides new polyureas of the general formula (—R—NH—CO—NH—)$_n$ in which R represents a residue of the formula —Ph— or —Ph—X—Ph— substituted by a free or esterified sulphonic acid group, and in which any residue R in the compound is bound to a further urea group or a free amino group, that is, any terminal R group is bound to a free amino group, and also salts of these polyureas. In the above formula, —Ph— represents a phenylene residue, X represents a bridge member, and $n$ represents a whole number such that the molecular weight of the compound is greater than 4000. As an esterified sulphonic acid group there may be mentioned such a group esterified with a lower alkanol, more especially a sulphonic acid group esterified with methyl alcohol. These polyureas may contain further substituents, for example, especially in the phenylene residues, and advantageously methyl groups or additional free or esterified sulphonic acid groups. The two phenylene residues bound together by the bridge member X may also be connected together by a carbon-to-carbon bond in ortho-position to X. Furthermore, the residues R in a single compound may be identical or different from one another.

The invention relates, more especially, to polyureas as defined above, in which R represents a residue of the formula —Ph— or —Ph—X—Ph— substituted by a free or esterified sulphonic acid group, in which —Ph— is a phenylene-(1:4)-residue which is advantageously free from further substituents or contains a methyl group as a substituent, X represents a divalent lower hydrocarbon radical, above all of the group —C≡C—, —CH=CH— or —CH$_2$—CH$_2$— or the group —NH—, and $n$ represents a whole number such that the molecular weight of the compound is within the range of $10^4$ and $10^6$.

The invention also includes mixtures of the aforesaid polyureas having different molecular weights. The following products, and also their esters and salts, are especially valuable:

The mixture of polyureas described in Example 1 below and having the formula

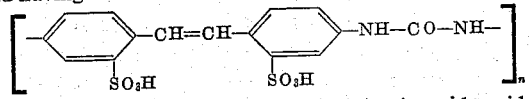

in which any terminal stilbene disulphonic acid residue in the compound is bound to a free amino group. It has a decomposition point above 350° C. and consists mainly of polyureas of the above formula having average molecular weights of 14,000, 124,000 and 440,000.

The mixture of polyureas described in Example 2 and having the formula

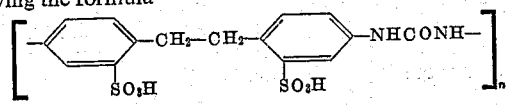

in which any terminal dibenzyl sulphonic acid residue in the compound is bound to a free amino group. It has a decomposition point above 325° C., and consists mainly of polyureas of the above formula having average molecular weights of 33,000 and 460,000.

The mixture of polyureas described in Example 4, and having the forumla

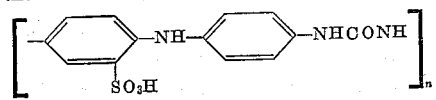

in which any terminal diphenylamino-2-sulphonic acid residue in the compound is bound to a free amino group. It has a decomposition point of about 280° C., and an average molecular weight of 20,000 to 80,000; and also the mixture of polyureas described in Example 5 and having the formula

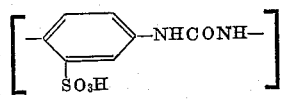

in which any terminal benzene sulphonic acid residue is bound to a free amino group. It has a decomposition point above 350° C. and is composed of polyureas having average molecular weights of 10,000, 117,000 and 980,000.

The new compounds possess valuable pharmacological properties. They exhibit a pronounced action against viruses. In a concentration of $10^{-6}$ (g./kg.) the aforesaid compounds check the propagation of influenza virus or New Castle disease virus in incubated chicken embryos. When administrated to laboratory animals, for example, rabbits, they bring about a distinct change in the tissue and blood in the direction of reducing their sensitivity to viruses.

The new compounds can in general be prepared by reacting a diamine compound of the formula $$H_2N—R—NH_2$$

or $$H_2N—(—R—NHCONH—)_m—R—NH_2$$

in which R has the meaning given above, and $m$ is a whole number such that the molecular weight is not greater than 4000, with a compound capable of forming a urea grouping —NH—CO—NH— by reaction with two primary amino groups. Accordingly, an amine of the above formula may be reacted, for example, with a dihalide of carbonic acid such as phosgene, advantageously in an aqueous, and especially acid, medium, if desired with the aid of heat.

Instead of using the free amines as starting materials, there may be used compounds which react as free amines under the conditions of the reaction. There may also be used mixtures of different amines, in which case compounds are obtained in which different residues R are present in the same molecule. As starting materials there are advantageously used those which lead to the compounds stated above to be especially valuable.

Depending on the procedure used the new compounds are obtained in the form of the free sulphonic acids or esters thereof. The esters or salts can be converted in the usual manner into the free acids, and the free acids can be converted in known manner by reaction with a base, for example, a metal hydroxide or carbonate, for example, an alkali metal or alkaline earth metal hydroxide or ammonia, into the corresponding salts, or they may be converted by esterification, for example, with diazo methane, into their esters.

When mixtures of polyureas are obtained they may be separated from one another by methods in themselves known, for example, by physical processes. It may, however, be of advantage to use the mixtures as such, since they may possess an improved action due to synergistic effects.

The starting materials used in the process of this invention are known or can be made by methods in themselves known.

The following examples illustrate the invention:

*Example 1*

Phosgene is introduced into 300 grams of an aqueous solution of 8.8 percent strength of sodium 4:4'-diamino-stilbene-2:2'-disulphonate at room temperature, while stirring, until the pH value of the reaction solution has fallen below 4.0, when a precipitate separates out. A quantity of acetone is then added amounting to 1.5 to 1.8 times the quantity of the mixture, and the latter is then filtered with suction and the product is washed with acetone of 60 percent strength. For the purpose of further purification, a solution of the product of 2 percent strength may be dialysed against water, the desired constituents being retained in the dialysing tube, or a solution of the product of 2 percent strength may be run through 8–9 times the quantity of an acid ion-exchanger (Amberlite JR 120) whereby a product free from inorganic salts is obtained. The product may be further purified by chromatography over a basic ion-exchanger (Amberlite JRA 400) in the following manner:

90 grams of Amberlite JRA 400 (Cl⁻), corresponding to 270 milli-equivalents and having a particle size ranging from 0.08 to 0.15 millilitre (100–170 mesh) are charged in the form of an aqueous suspension into a long thin column. The column has an internal diameter of 14 mm. and a height of 157 cm., and the volume of the Amberlite charge is 192.5 cm. After cleaning the resin column with N-hydrochloric acid and boiled distilled water, it is converted into the basic form by washing it with an 0.05 N-solution of caustic soda (free from carbonate) and distilled water, the speed of travel being about 0.5 cm. per square cm. per minute. 5.5 grams of the pre-purified product (corresponding to about 30 milli-equivalents) are then dissolved in 300 cc. of boiled distilled water, and transferred to the column. The column is then washed with water and a 0.05 N-solution of caustic soda. The active constituents of the product appear immediately in the elutriate, whereas the impurities remain in the column.

The product so obtained corresponds to a mixture of polyureas of the formula

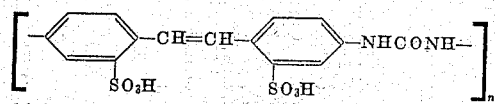

in which any terminal stilbene disulphonic acid radical in the compound is bound to a free amino group, and which product is a reddish brown powder having a decomposing point above 350° C. It dissolves well in water in the form of the free acid, and also in the form of its alkali metal salts, e. g. sodium and potassium salts prepared by treating with sodium hydroxide and potassium hydroxide, respectively, and the ammonium salt prepared by treating with ammonium hydroxide. Tests in an ultra-centrifuge show that it is a mixture of polyureas of high molecular weight corresponding to the above formula, consisting primarily of polyureas having sedimentation constants $S_{20}$ of $9.3 \times 10^{-13}$, $82 \times 10^{-13}$ and $290 \times 10^{-13}$. The mean diffusion constant determined in an electrophoretic apparatus is $35 \times 10^{-7}$. From this data and the specific volume $1-V_s=0.4$ it can be calculated in known manner that the average molecular weights of these polyureas are about 14,000, 124,000 and 440,000.

*Example 2*

16 grams of 4:4'-diamino-dibenzyl-2:2'-disulphonic acid and 58 grams of crystalline sodium acetate are dissolved in 340 cc. of water with the aid of heat, and the solution is cooled to room temperature. Its pH value is about 6.5. Phosgene is then introduced slowly into the solution while stirring or vibrating it well, whereupon a yellow product precipitates. After 2 hours the pH value falls to about 3, and then the pH value is adjusted to 1 with a small quantity of concentrated hydrochloric acid, the mixture is cooled overnight to 0° C., and then the precipitate is separated by centrifuging, washed with a small amount of water and dried on a clay plate at 80° C. The product so obtained, which is soluble in water and free from inorganic salts by dialysis, corresponds to a mixture of polyureas of the formula

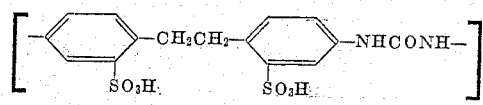

in which any terminal dibenzyl sulphonic acid radical in the compound is bound to a free amino group. It has a decomposition point above 325° C. From measurements made in an ultra-centrifuge ($S_{20}=24 \times 10^{-13}$, $320 \times 10^{-13}$) the mean diffusion constant of $D=40 \times 10^{-7}$ and the specific volume $1-V_s=0.35$, it is calculated that the mixture consists substantially of polyureas having the average molecular weights of about 33,000 and 460,000.

*Example 3*

11 grams of 4:4'-diamino-tolane-2:2'-disulphonic acid are dissolved in 150 cc. of water with the addition of the calculated quantity of a 2 N-solution of caustic soda. After the addition of 21 grams of crystalline sodium acetate in 80 cc. of water, phosgene is slowly introduced while stirring or vibrating the mixture strongly, until the pH value of the solution has fallen from an initial value of 6.5–7 to below 2. The highly viscous red-brown liquid is then diluted with 100 cc. of water and mixed with 350 cc. of acetone, while stirring strongly, and then the precipitate is separated by centrifuging and dried at 80° C. The product so obtained corresponds to a mixture of polyureas of the formula

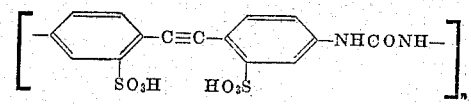

in which any terminal tolane disulphonic acid radical in the compound is bound to a free amino group. It is an ochre coloured powder having a decomposition point above 300° C. Its ammonium salt is easily soluble in water. Measurements carried out as described in Examples 1 and 2 show that the product has an average molecular weight of about 150,000.

*Example 4*

40 grams of sodium 4:4'-diamino-diphenylamine-2-sulphonate are dissolved in 500 cc. of water. Phosgene is then introduced, during which the reaction is maintained weakly acid to neutral by the addition of sodium carbonate. When the starting material can no longer be detected by means of a coupling reaction, the mixture is filtered with suction while weakly acid, and the filtered residue is washed with hot water. The product, after being freed from inorganic salts by dialysis, corresponds to a mixture of polyureas of the formula

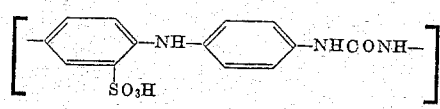

in which any terminal diphenylamine sulphonic acid radical in the compound is bound to a free amino group. The dry grey product has a decomposition point of about 280° C. In contradistinction to the free acid, its ammonium salt is easily soluble in water. Molecular weight determinations indicate that it has an average molecular weight of about 20,000 to 80,000.

Example 5

25 parts of para-phenylene diamine-2-sulphonic acid are dissolved in 400 cc. of water with the addition of the calculated quantity of a 2 N-solution of caustic soda (pH value of solution=7), and the solution is mixed with a solution of 68 grams of crystalline sodium acetate in 150 cc. of water. Phosgene is then slowly introduced, while stirring, or vibrating the mixture strongly, until the reaction solution has a pH value below 2, whereby a grey-violet product precipitates. It is filtered off with suction, washed with water and dried at 80° C. The pale grey-violet product so obtained of which the ammonium salt dissolves well in water has a decomposition point above 350° C., and corresponds to a mixture of polyureas of the formula

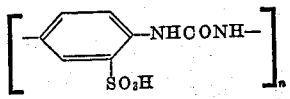

in which each terminal benzene sulphonic acid radical in the compound is bound to a free amino group. Its mean diffusion constant D is $40 \times 10^{-7}$. In the ultracentrifuge the following main sedimentation constants are obtained: $S_{20} = 6.6 \times 10^{-13}$, $77 \times 10^{-13}$ and $450 \times 10^{-13}$. Its specific volume $1-V_s$ is found to be 0.4. Accordingly, the product is composed principally of polyureas of the above formula having average molecular weights of about 10,000, 117,000 and 980,000.

Example 6

25 grams of 4:4'-diamino diphenyl sulphide-2:2'-disulphonic acid are dissolved in 250 cc. of water with the addition of the calculated quantity of a 2 N-solution of caustic soda. After mixing the solution with 60 grams of crystalline sodium acetate in 140 cc. of water, phosgene is slowly introduced into the solution while stirring strongly, until the reaction mixture has a pH value of at least 2. After adding three times the quantity of acetone and mixing well, the precipitated product is filtered off with suction, washed with a small amount of acetone of 70 percent strength, and dried at 80° C. The product, which is an almost colorless powder and has a decomposition point above 300° C., corresponds to a mixture of polyureas of the formula

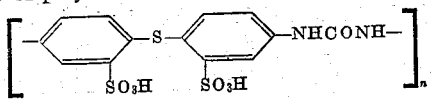

in which any terminal diphenyl sulphite disulphonic acid radical in the compound is bound to a free amino group. It is easily soluble in water in the form of its ammonium salt. Measurements of the sedimentation constants, the diffusion constant and the specific volume show that it consists principally of polyureas having average molecular weights of about 10,000, 117,000 and 980,000.

Example 7

5 grams of the product obtained as described in Example 1 are dissolved in 150 cc. of water. 75 cc. of methanol are then added. The solution is cooled with ice and mixed in portions, while agitating, with an excess of an ethereal solution of diazomethane. A vigorous evolution of nitrogen takes place. When this has subsided, the aqueous methanolic layer is separated off, and evaporated in vacuo at 40° C. The water-soluble product so obtained corresponds to a mixture of polyureas of the formula

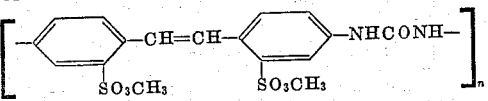

in which any terminal stilbene disulphonic acid methyl ester radical in the compound is bound to a free amino group. It has average molecular weights corresponding to those of the non-esterified product described in Example 1.

Example 8

10 grams of bis-4:4-(4'-aminostilbene-2:2'-disulphonic acid)-urea of the formula

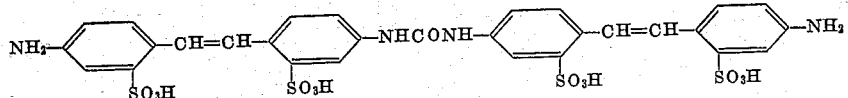

are dissolved in 150 cc. of water with the addition of the calculated quantity of a 2 N-solution of caustic soda. Phosgene is slowly introduced at room temperature, while stirring, until the pH value of the reaction solution has fallen below 2, whereupon a precipitate separates out. 1.5 times the quantity of acetone are added, the mixture is filtered with suction, the product is washed with acetone of 60 percent strength, and freed from inorganic salts by dialysis. The resulting product corresponds to the product of Example 1. The mono-urea necessary for preparing this polyurea is prepared as follows:

10 grams of 4-amino-4'-nitrostilbene-2:2'-disulphonic acid are dissolved neutral in 150 cc. of water with the addition of sodium carbonate. Phosgene is introduced into the solution until the pH value has fallen below 5, the mixture is then allowed to stand for a short time, and the product is filtered off with suction and washed with water. The reddish colored urea so obtained having the formula

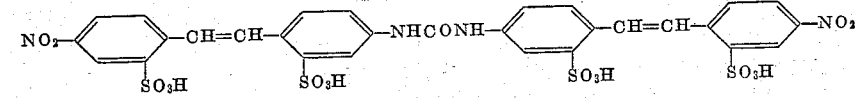

is then reduced in the following manner: Into a suspension of 8 grams of the nitro compound in a mixture of 50 cc. of concentrated aqueous ammonia and 50 cc. of water a stream of hydrogen sulfide gas is introduced while stirring. The suspended material dissolves within 3 hours. After this period of time the ammonia and excess hydrogen sulfide are removed by boiling the solution for 1 hour. The hot solution is filtered from the precipitated sulfur and the filtrate is acidified and cooled. The urea of the formula

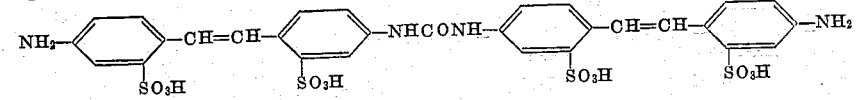

is obtained in the form of a reddish yellow powder, which becomes red-brown on exposure to light. It dissolves fairly well in water.

Example 9

20 grams of 2:7-diamino-dibenzo-thiophene dioxide-3:6-disulphonic acid are dissolved in 300 cc. of water with the addition of the calculated quantity of a 2 N-solution of caustic soda, and the solution is mixed with 55 grams of crystalline sodium acetate in 150 cc. of water. Phosgene is slowly introduced at 20° C. while stirring or vibrating the mixture strongly, until the pH value of the reaction solution is smaller than 2. The mixture is then salted out with 150 grams of sodium chloride, the precipitated product is suspended in 150 cc. of water, filtered with suction, freed from residual inorganic salts by dialysis, and dried at 80° C. The yellowish product corresponds to a mixture of polyureas of the formula

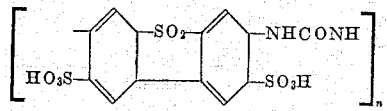

in which any terminal dibenzothiophene dioxide disulphonic acid radical in the compound is bound to a free amino group. It dissolves easily in water in the form of its ammonium salt.

The diffusion constant D of the product is $61 \times 10^{-7}$, its specific volume $1-V_s$ is 0.4, its sedimentation constant is $76 \times 10^{-13}$, and from this data it has an average molecular weight of about 80,000.

What is claimed is:

1. A member of the group consisting of polyureas, mixtures thereof, and the salts thereof, which can be represented by the general formula $$(-R-NH-CO-NH-)_n$$

in which R represents a residue of the group consisting of —Ph— and —Ph—X—Ph— substituted by a member of the group consisting of free and esterified sulphonic acid groups, in which —Ph— represents a phenylene residue, X represents a member of the group consisting of —C≡C—, —CH=CH—, —CH$_2$—CH$_2$— and —NH— radicals, and $n$ represents a whole number such that the molecular weight of the compound is greater than 4000 and in which any terminal residue R in the compound is bound to a free amino group.

2. Polyureas as claimed in claim 1, in which —Ph— represents a phenylene-(1:4)-residue, X represents a member selected from the group consisting of a —C≡C—, —CH=CH—, —CH$_2$—CH$_2$— group and a —NH— group, and $n$ represents a whole number such that the molecular weight is within the range of about $10^4$ to about $10^6$.

3. The polyurea of the formula

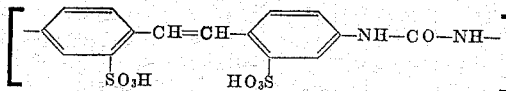

in which any terminal stilbene disulphonic acid residue in the compound is bound to a free amino group, and which has an average molecular weight of about 14,000.

4. The polyurea of the formula

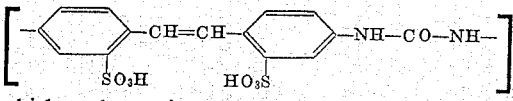

in which each terminal stilbene disulphonic acid residue in the compound is bound to a free amino group, and which has an average molecular weight of about 124,000.

5. The polyurea of the formula

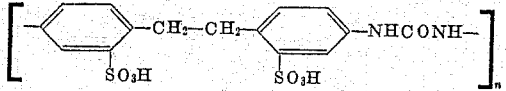

in which any terminal disulphonic acid residue in the compound is bound to a free amino group, and which has the average molecular weight of about 33,000.

6. The polyurea of the formula

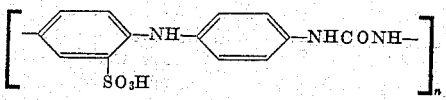

in which any terminal diphenylamine-2-sulphonic acid residue in the compound is bound to a free amino group, and which has an average molecular weight of about 20,000 to 80,000.

7. The polyurea of the formula

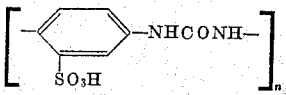

in which any terminal benzene sulphonic acid residue in the compound is bound to a free amino group, and which has an average molecular weight of about 117,000.

8. The polyurea of the formula

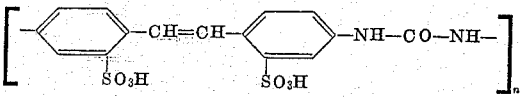

in which any terminal stilbene disulphonic acid residue in the compound is bound to a free amino group, and which has the average molecular weight of about 440,000.

9. The polyurea of the formula

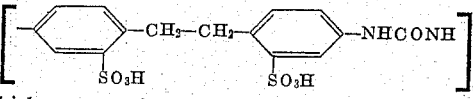

in which any terminal dibenzyl sulphonic acid residue in the compound is bound to a free amino group, and which has the average molecular weight of about 460,000.

10. The polyurea of the formula

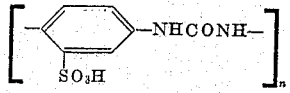

in which any terminal benzene sulphonic acid residue in the compound is bound to a free amino group, and which has an average molecular weight of about 10,000.

11. The polyurea of the formula

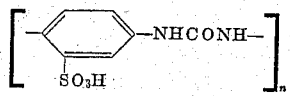

in which any terminal benzene sulphonic acid residue in the compound is bound to a free amino group, and which has average molecular weight of about 980,000.

References Cited in the file of this patent

UNITED STATES PATENTS

| | | |
|---|---|---|
| 1,218,656 | Thomaschewski | Mar. 13, 1917 |
| 2,676,982 | Freyermuth et al. | Apr. 27, 1954 |

FOREIGN PATENTS

| | | |
|---|---|---|
| 286,752 | Germany | Aug. 27, 1915 |